United States Patent

Pinkston

[11] Patent Number: 5,803,699
[45] Date of Patent: Sep. 8, 1998

[54] APPARATUS AND METHOD FOR LOADING AND UNLOADING CONTAINERS

[75] Inventor: Donald L. Pinkston, Williamston, Mich.

[73] Assignee: Capitol Tool and Die Co., Williamston, Mich.

[21] Appl. No.: 747,324

[22] Filed: Nov. 12, 1996

[51] Int. Cl.⁶ ........................ B60P 1/00
[52] U.S. Cl. ............ 414/498; 414/491; 414/555; 414/786
[58] Field of Search .................. 414/498, 546, 414/547, 555, 786, 491; 294/68.3, 81.5, 81.2, 81.21

[56] References Cited

U.S. PATENT DOCUMENTS

| | | | |
|---|---|---|---|
| 2,721,757 | 10/1955 | Anderson | 294/81.2 |
| 3,071,264 | 1/1963 | Totaro et al. | 414/498 X |
| 3,253,852 | 5/1966 | Wheat | 294/81.5 X |
| 3,387,729 | 6/1968 | Hindin | 294/81.5 X |
| 3,387,730 | 6/1968 | Levitt . | |
| 3,749,363 | 7/1973 | Hauser | 414/498 X |
| 3,809,270 | 5/1974 | Peltonen . | |
| 3,817,414 | 6/1974 | Peltonen . | |
| 3,892,323 | 7/1975 | Corompt . | |
| 4,045,000 | 8/1977 | Mai | 414/498 X |
| 4,053,074 | 10/1977 | Lemaire . | |
| 4,111,321 | 9/1978 | Webster . | |
| 4,132,325 | 1/1979 | Corompt . | |
| 4,147,266 | 4/1979 | Corompt . | |
| 4,175,904 | 11/1979 | Airaksinen . | |
| 4,204,793 | 5/1980 | Lemaire . | |
| 4,453,878 | 6/1984 | Paukku . | |
| 4,652,201 | 3/1987 | Boughton . | |
| 4,789,194 | 12/1988 | Watson . | |
| 4,854,807 | 8/1989 | Bishop | 414/498 |
| 4,915,567 | 4/1990 | Ellingsen | 414/498 X |
| 4,936,733 | 6/1990 | Girerd | 414/498 X |
| 4,968,080 | 11/1990 | Kerry . | |
| 5,018,932 | 5/1991 | Croisier . | |
| 5,163,800 | 11/1992 | Raisio . | |
| 5,213,466 | 5/1993 | Bubik . | |

FOREIGN PATENT DOCUMENTS

| | | | |
|---|---|---|---|
| 81172 | 6/1956 | Denmark . | |
| 0123723 | 11/1984 | European Pat. Off. | 414/498 |
| 1516897 | 12/1966 | France . | |
| 3640323 | 11/1985 | Germany . | |
| 3633862 | 9/1988 | Germany | 414/498 |
| 3922811 | 11/1989 | Germany . | |
| 286143 | 1/1991 | Germany | 414/498 |
| 8303331 | 4/1985 | Netherlands | 414/498 |
| 1176251 | 1/1970 | United Kingdom . | |
| 2220921 | 1/1990 | United Kingdom | 414/498 |

*Primary Examiner*—David A. Bucci
*Attorney, Agent, or Firm*—Ian C. McLeod; Mary M. Moyne

[57] ABSTRACT

An apparatus and method for loading a container (250) onto a trailer (10) for transport by a vehicle (200) and for unloading the container from the trailer. The trailer includes a frame (32) mounted on two rear axles (36 and 38), a lift device (86) and front and rear securing pads (68 and 44). An adjustable and removable spider (122) is connected to the lift device and connects to the front end (250A) of the container to allow the lift device to move the container onto the trailer. To load the container, the spider is adjusted to the correct height by adjusting the length of the side members (126). Adaptors (154) can also be used for shorter containers. The lift device is extended and the spider is attached to the top and bottom corners (252 and 254) of the container. Securing chains (164) having lifting lugs (166) and are connected between the spider and the bottom corners of the container. The lift device is then retracted and the container is loaded onto the trailer. The container is locked on the securing pads by the locking mechanisms (56 and 78).

25 Claims, 9 Drawing Sheets

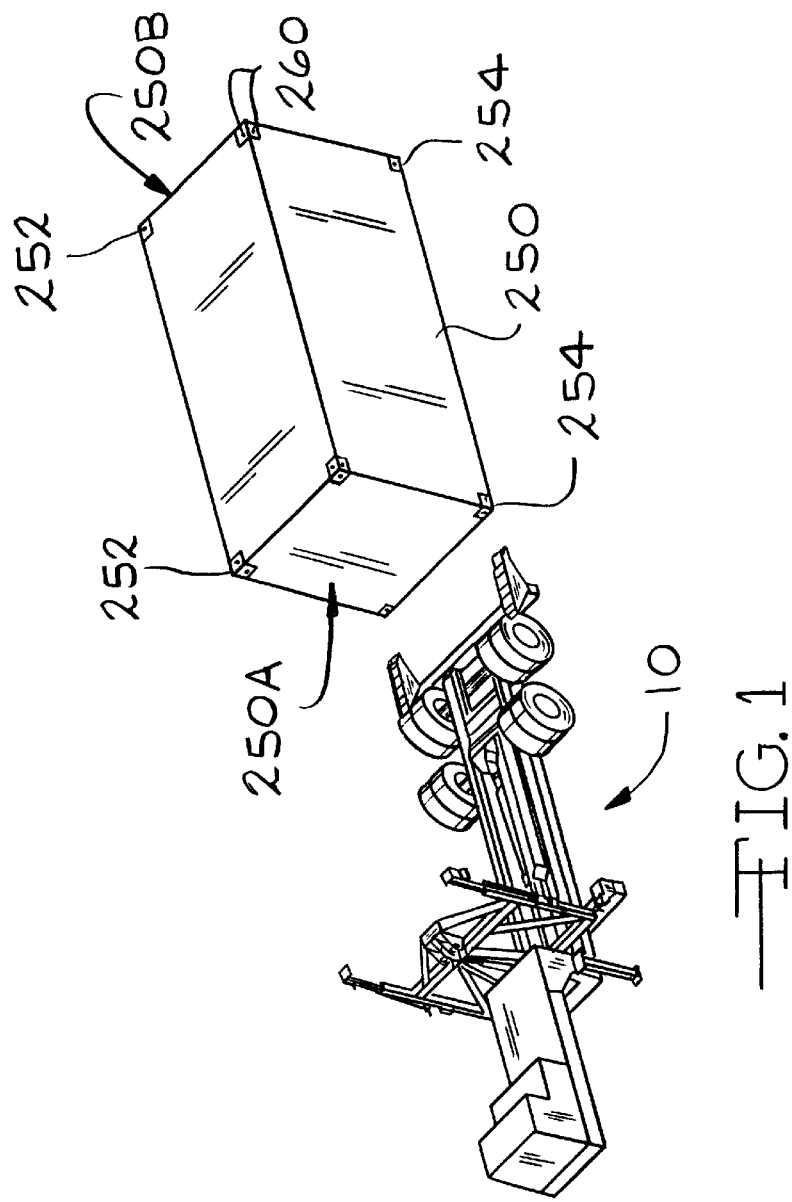
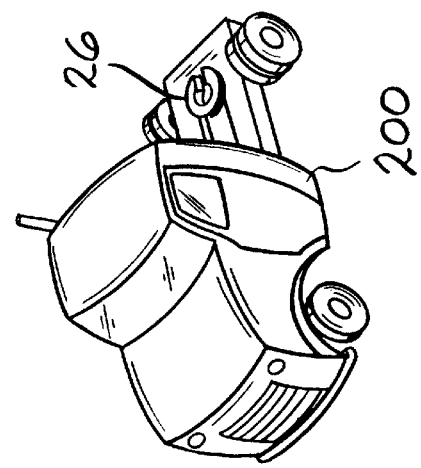
FIG. 1

APPARATUS AND METHOD FOR LOADING AND UNLOADING CONTAINERS

BACKGROUND OF THE INVENTION

(1) Field of the Invention

The present invention relates to an apparatus and method for loading a container for transportation of the container by a vehicle and for unloading the container. In particular, the present invention relates to a self-contained trailer having an adjustable spider connected to a lift device which moves the I.S.O. container on and off the trailer for loading and unloading of the container to allow for transportation of the container by the vehicle.

(2) Description of the Related Art

The related art has shown various types of trailers having lift devices for loading and unloading containers onto the trailers for transportation by vehicle. Illustrative are U.S. Pat. Nos. 3,892,323, 4,132,325 and 4,147,266 all to Corompt; 4,111,321 to Webster; 4,175,904 to Airaksinen; 4,053,074 and 4,204,793 both to Lemaire; 4,453,878 to Paukku; 4,652,201 to Boughton; 5,018,932 to Croisier; 5,163,800 to Raisio and 5,213,466 to Bubik. Also German Patent No. DE 3,922,811 to Christiansen.

The prior art has also shown adjustable devices for attaching the lift device to the container. In particular, U.S. Pat. No. 4,968,080 to Kerry describes a device for attaching a lifting mechanism to a container. The device includes a central body portion having a lifting hook bar, a pair of lower arms and a pair of upper arms. The lower arms are rigidly secured to and extend downwardly and outwardly from the body portion. The free end of each arm has a twistlock for cooperation with the lower fittings of a standard I.S.O. container. The upper arms are each pivotably mounted to the body portion and are provided with slots at the pivot point. The upper arms can pivot and slide axially to allow the free ends of the upper arms to be aligned with the upper corner fittings of an I.S.O. container having any standard height. The free end of the upper arms have hook members which rotate to allow for locating the hook members in their operative position for each position of the arm members.

Further, U.S. Pat. Nos. 3,387,730 to Levitt; 3,809,270 and 3,817,414 to Peltonen; and German Patent No. DE 3,640,323 to Wenger and French Patent No. 1,516,897 to Ackermann show various types of locking and securing pins to secure containers to the lifting devices for loading on the trailer for transport and for unloading from the trailer.

Only of minimal interest are Patent Nos. 81,172 (Denmark); 1,176,251 (Great Britain) and U.S. Pat. No. 4,789,194 to Watson.

There remains the need for a self-contained trailer which uses an easily adjustable spider for attaching to containers having different heights and having different orientations on the ground surface prior to loading.

OBJECTS

It is therefore an object of the present invention to provide a self-contained trailer having a lift device for loading of a container on the trailer, for transport by a vehicle and for unloading of the container from the trailer. Further, it is an object of the present invention to provide a trailer having a lift device with an adjustable spider for loading and unloading a container onto the trailer. Still further, it is an object of the present invention to provide an adjustable spider for attachment to an end of the container to allow containers having different heights to be loaded and unloaded onto the trailer using the same spider. Further still, it is an object of the present invention to provide a trailer which moves backward under the container as the container is lifted about one end to load the container on the trailer. Further, it is an object of the present invention to provide a trailer which is able to load containers having different orientations on the ground surface without adjusting the lift device or the spider. These and other objects will become increasingly apparent by reference to the following drawings and the description.

BRIEF DESCRIPTION OF THE DRAWINGS

FIG. 1 is a perspective view of the trailer 10, the vehicle 200 and the container 250.

DETAILED DESCRIPTION OF THE PREFERRED EMBODIMENTS

Figure 2:
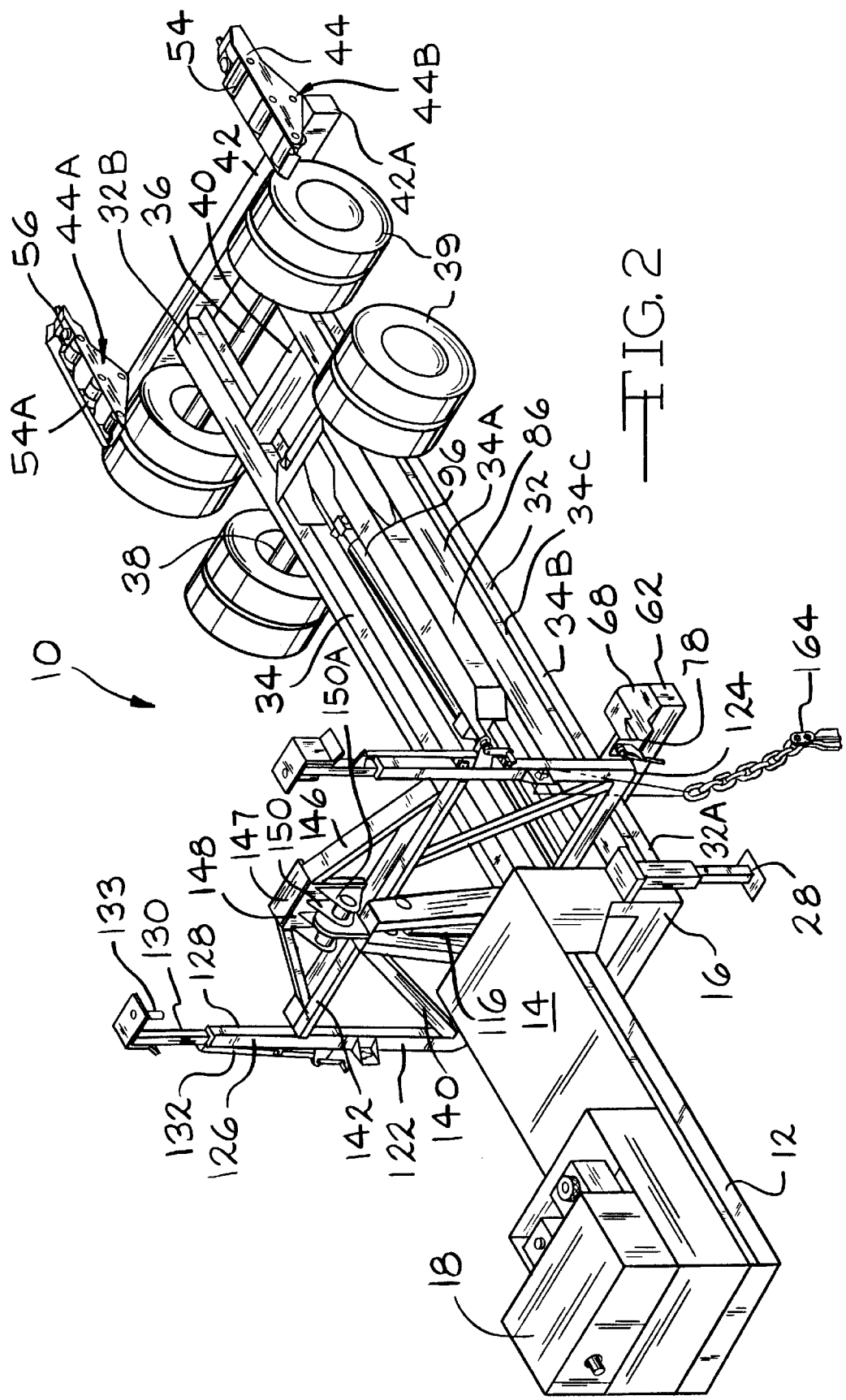
FIG. 2 is a perspective view of the trailer 10 of the present invention.

The present invention relates to a self-contained trailer which connects to a vehicle and is adjacent a box-like container having opposed ends with a pair of top corners and a pair of bottom corners at each end for loading of the container on the trailer for transport by the vehicle and for unloading of the container from the trailer, which comprises: a front section having opposed ends with a top side and a bottom side extending between the ends and with a mounting hitch mounted on the bottom side for connecting the trailer to the vehicle; a frame means having a front end and a rear end with sides extending therebetween along a longitudinal axis of the trailer with the front end of the frame means connected to one end of the front section; at least one rear axle having wheels and mounted adjacent the rear end of the frame means; a lifting means having a first end and a second end and mounted at the first end on the frame means between the ends of the frame means; a removable and adjustable attachment means connected to the second end of the lifting means for attachment to the top and bottom corners of the container at one end for holding the container during loading and unloading of the container on the trailer and having parallel, spaced apart elongate members with opposed ends wherein each of the elongate members are extendable between the ends and lockable to allow the attachment means to be attached and locked onto containers having different heights; a control means mounted on the top side of the front section for controlling the lifting means for loading and unloading the container; and front and rear pads for securing the bottom corners of the container at both ends onto the trailer.

Further, the present invention relates to an improved attachment structure for use with a trailer which connects to a vehicle and adjacent a box-like container having opposed ends with a pair of top corners and a pair of bottom corners at each end, the trailer having a lifting means with a connector means for connecting to the attachment structure for loading of the container on the trailer for transport by the vehicle and for unloading the container from the trailer, the attachment structure which comprises: two spaced apart, parallel and adjustable elongate side members with a top end and a bottom end, each wherein the elongate side members have extensions which are telescopingly mounted and configured to be attached and locked to the top corners of the container at one end; and a connection means mounted on the attachment structure between the elongated side members on a side opposite the container when the attachment structure is attached to one end of the container, wherein the connection means engages the connector means on the lifting means of the trailer to enable the lifting means to load the container onto the trailer.

Still further, the present invention relates to a method for loading a box-like container on a trailer for transport by a vehicle, the container having opposed ends with a pair of top corners and a pair of bottom corners at each end with openings at the corners, which comprises: providing a self-contained trailer which connects to the vehicle and is adjacent the box-like container for transport of the container by the vehicle, the trailer including a front section having opposed ends with a top side and a bottom side extending between the ends and with a mounting hitch mounted on the bottom side for connecting the trailer to the vehicle; a frame means having a front end and a rear end with sides extending therebetween along a longitudinal axis of the trailer with the front end of the frame means connected to one end of the front section; at least one rear axle having wheels and mounted adjacent the rear end of the frame means; a lifting means having a first end and a second end and mounted at the first end on the frame means between the ends of the frame means; a removable and adjustable attachment means connected to the second end of the lifting means for attachment to the top and bottom corners of the container at one end for holding the container during loading and unloading of the container on the trailer and having parallel spaced apart elongate side members with opposed ends wherein each of the elongate side members are extendable between the ends and lockable to allow the attachment means to be attached and locked onto containers having different heights; a control means mounted on the top side of the front section for controlling the lifting means for loading and unloading the container; and front and rear pads for securing the bottom corners of the container at both ends onto the trailer; connecting the trailer to the vehicle using the mounting hitch; moving the vehicle and trailer adjacent one end of the container so that the rear end of the frame means opposite the vehicle is adjacent the one end of the container; extending the lifting means of the trailer using the control means so that the attachment means is adjacent the one end of the container; attaching the attachment means to the top and bottom corners of the container at the one end; and retracting the lifting means with the vehicle in neutral so that the container is moved onto the trailer along the longitudinal axis of the trailer wherein as the lifting means lifts the container, the vehicle and trailer are pulled toward the container so that the container moves onto the trailer.

Figure 3:
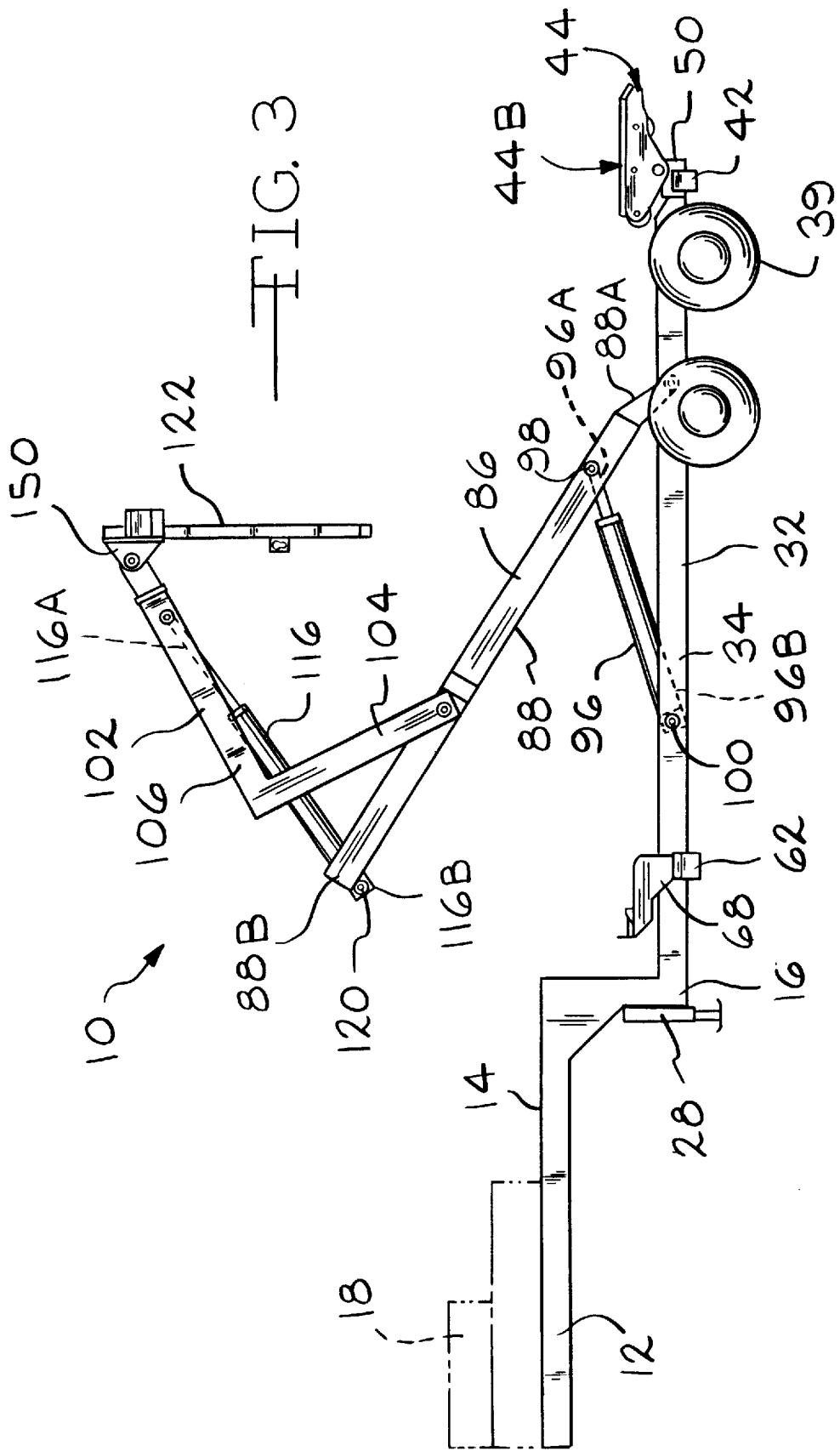
FIG. 3 is a side view of the trailer 10 with the lift device 86 in the semi-extended position.

FIGS. 1 to 3 show the trailer 10 of the present invention having a lift device 86 for loading a container 250 for transport of the container 250 by a vehicle 200 and for unloading the container 250 from the trailer 10. A container can be any container, deck, A-frame rack, etc. which is loaded onto a trailer 10 for transport of loads by a vehicle 200. The vehicle 200 is preferably a standard semi-trailer cab having a fifth wheel connector (not shown) (FIG. 1). The container 250 preferably has a box-like shape and is similar to a standard I.S.O. container 250 having a front end 250A and a back end 250B with a pair of top corners 252 and a pair of bottom corners 254 at each end (FIG. 1). The corners 252 and 254 preferably have openings 260 on all three sides to allow the container 250 to be secured to the spider 122 or the trailer 10 (to be described in detail hereinafter). In the preferred embodiment, the container 250 has a length end to end of 240.0 inches (609.6 cm) and a width of 96.0 inches (244 cm). Preferably, the height of the container 250 from the top corners 252 to the bottom corners 254 is one of three standard heights of 54.0 inches (137 cm), 96.0 inches (244 cm) or 102.0 inches (259 cm). Preferably, the trailer 10 is able to load and unload a container 250 having a weight of approximately 30,000 to 40,000 lbs. when full, regardless of the size of the container 250.

Figure 10:
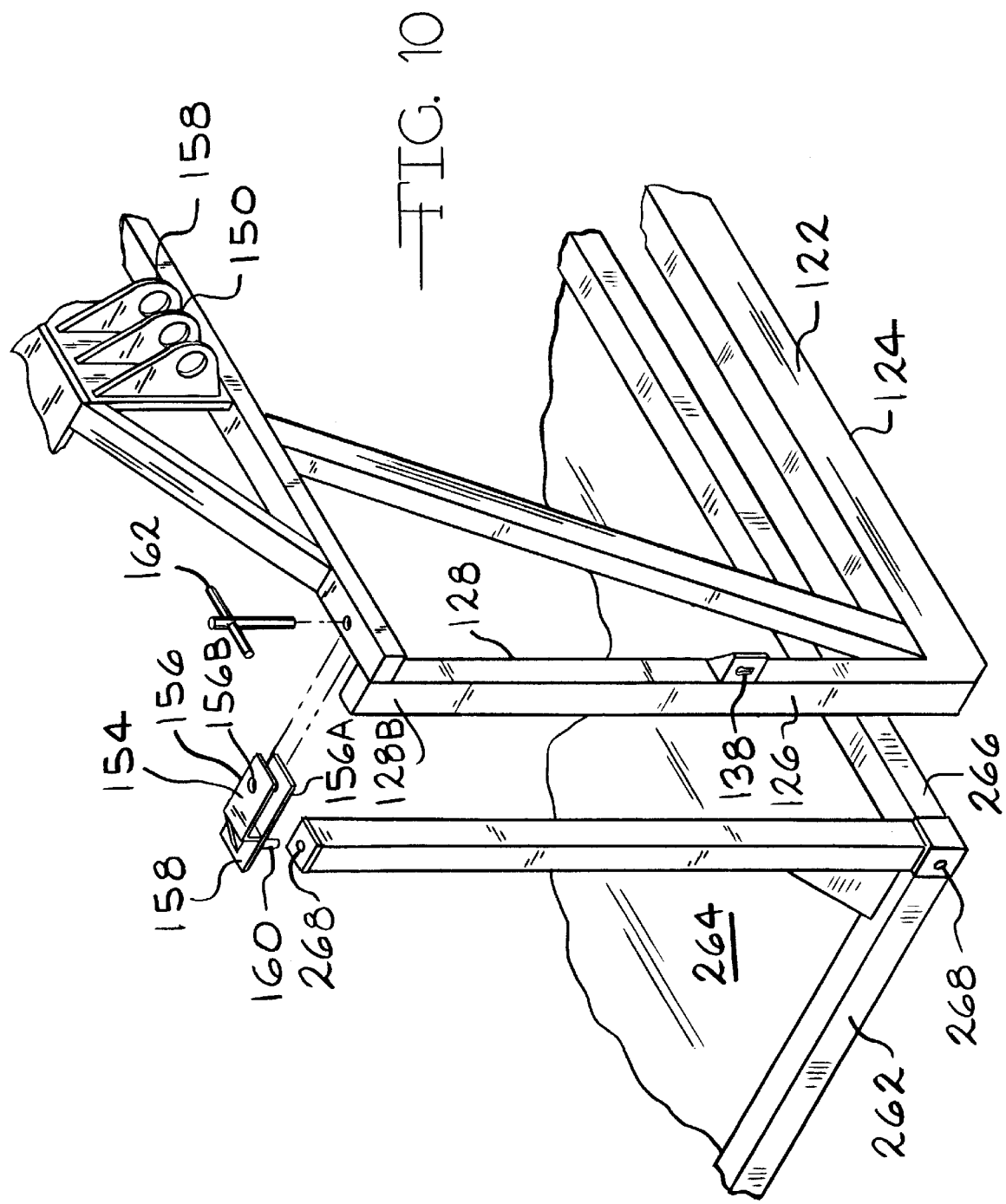
FIG. 10 is the spider 122 showing the adaptor 154 for attachment of the spider 122 to a container 250 having a smaller height.

In an alternate embodiment, the trailer 10 is used to load and unload a deck 262 (FIG. 10). The deck 262 includes a floor 264 and a front end 266. The front end 266 preferably has four corners (two shown) with openings 268 (one shown) for securing the deck 262 to the trailer 10 and the spider 122 (to be described in detail hereinafter). The corners of the deck 262 are preferably similar to the corners 252 and 254 of the container 250. The deck 262 preferably has a width equal to the width of the container 250 and has a height of 54.0 inches (137 cm). The deck 262 is preferably similar to those well known in the art for carrying cars.

The trailer 10, as shown in FIG. 2, includes a front section 12, a frame 32, a lift device 86 and a spider 122. The front section 12 preferably has a platform 14 with an end wall 16 mounted at one end of the platform 14 at a 90° angle such that the front section 12 has an L-shape. The end wall 16 is attached to one end of the frame 32 of the trailer 10. The trailer 10 is preferably self-contained and has an engine (not shown) and a controller 18 mounted on the front section 12 and tanks (not shown) mounted on the frame 32. The controller 18 and engine are mounted on the top of the platform 14 on the end opposite the end wall 16. The controller 18 preferably includes electrical circuitry for controlling the motor (not shown) for raising and lowering of the lift device 86. The controller 18 is preferably operated by a remote control unit (not shown) which is connected to the controller 18 by a cable (not shown). In the preferred embodiment, the cable is approximately 50.0 ft (127.0 cm) long. The engine is preferably a 25 HP diesel engine. A fifth wheel kingpin (not shown) is preferably mounted on the bottom side of the front section 12 for attaching the trailer 10 to the vehicle 200. Although a fifth wheel hitch attachment 26 is preferred, any well known hitching means may be used. The end of the front section 12 adjacent the end wall 16 is preferably provided with extendable legs 28 or stands which extend downward away from the platform 14. The legs 28 are preferably extended by using a crank (not shown) on each leg 28 to raise and lower the legs 28. The legs 28 are preferably similar to those well known in the art.

The frame 32 of the trailer 10 has a front end 32A and a back end 32B with a pair of frame members 34 extending between the ends 32A and 32B. The frame members 34 are preferably spaced apart and parallel to each other and define the longitudinal axis A—A of the trailer 10. The frame members 34 are preferably I-beams similar to those well known in the art and have a top flange 34A and a bottom flange 34B with webbing 34C spaced therebetween. The members 34 are positioned so that the top flange 34A is spaced above the bottom flange 34B with the webbing 34C extending vertically therebetween. The frame members 34 are mounted on a pair of rear axles 36 and 38 by a suspension system (not shown). The real axles 36 and 38 have wheels 39 which allow for transport of the trailer 10 by the vehicle 200. In the preferred embodiment, there are two rear axles 36 and 38. However, the trailer 10 can have as many axles as necessary to make the trailer 10 stable and able to carry the load of the container 250. In the preferred embodiment, the first rear axle 36 is adjacent the back end 32B of the trailer 10 and the second rear axle 38 is spaced apart from the first rear axle 36 toward the front end 32A of the frame 32. The second rear axle 38 is preferably positioned slightly in front of the point of attachment of the lift device 86 (to be described in detail hereinafter). The axles 36 and 38 and wheels 39 are preferably similar to those well known in the art for use with semi-tractor trailers.

Figure 5:
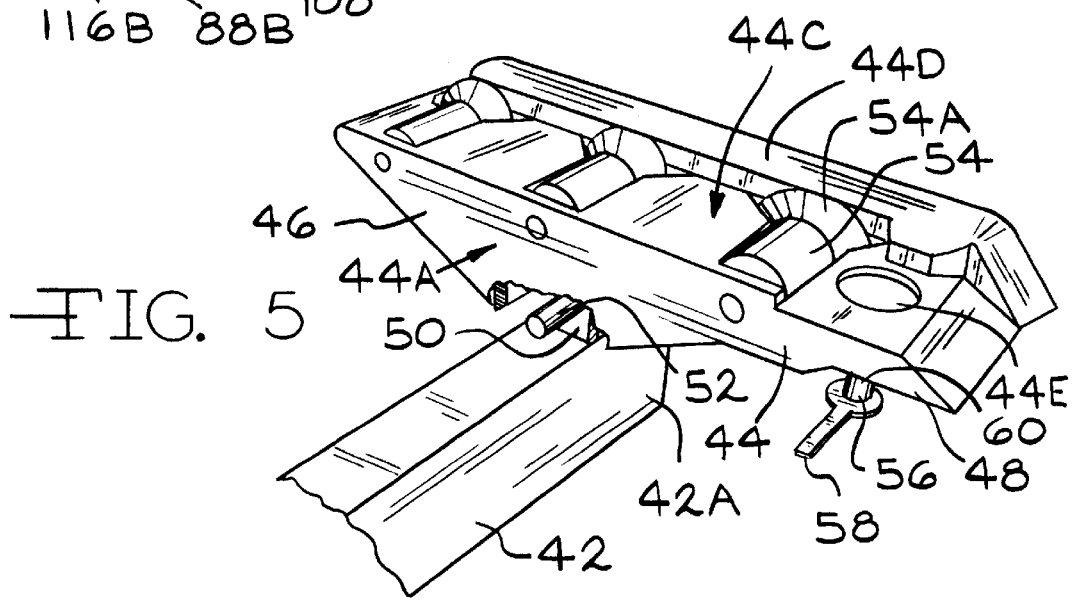
FIG. 5 is a partial perspective view of the rear securing pad 44.

A first cross bar 40 extends between the frame members 34 and is spaced between the axles 36 and 38. The first cross bar 40 allows for mounting of the hydraulics and electrical connections (not shown) for operating the trailer 10. A second cross bar (not shown) is preferably mounted between the frame members 34 in front of the second rear axle 38 toward the front end 32A of the frame 32. The second cross bar provides a mount for the second end 116B of the second piston member 116 (to be described in detail hereinafter). The first cross bar 40 and second cross bar also add structural support to the frame 32. An end beam 42 having opposed ends 42A is mounted on the back end 32B of the frame 32. The end beam 42 is mounted on and secured to the ends of the frame members 34. In the preferred embodiment, the end beam 42 is secured to the frame members 34 by welding. The end beam 42 is preferably positioned below the top flanges 34A of the frame members 34 and extends below the bottom flanges 34B of the frame members 34. The end beam 42 preferably has a rectangular, tubular shape. The end beam 42 is of such a length that the ends 42A of the beam 42 extend outward beyond the frame members 34 and beyond the wheels 39 of the first rear axle 36 in both directions. A pair of rear securing pads 44 are mounted at each end 42A of the end beam 42. The rear securing pads 44 are mounted on the top side of the end beam 42 and extend upward above the frame members 34 and the wheels 39 (FIG. 3). In the preferred embodiment, the securing pads 44 are mirror images of each other and only one will be described in detail. The securing pad 44 preferably has an inner side 44A and an identical outer side 44B which are spaced apart and connected together by a center portion 44C (FIG. 5). The sides 44A and 44B preferably have a main portion 46 and an extension portion 48. The main portion 46 of the sides 44A and 44B preferably has an essentially obtuse, triangular shape. The securing pad 44 is mounted such that the apex of the triangle of the main portion 46 is adjacent the end beam 42 and the frame 32 with the inner side 44A facing inward toward the frame 32 (FIG. 5). The securing pad 44 is preferably mounted to the end beam 42 of the frame 32 by a bracket 50 (one shown FIG. 5) which is fixably secured to the end beam 42. The bracket 50 has a hollow cylinder (not shown) which extends parallel to the end beam 42 slightly above the end beam 42. The cylinder is of such a length as to fit between the sides 44A and 44B of the rear securing pad 44 at the main portion 46 to mount the securing pad 44 on the bracket 50. The apex of the main portion 46 is mounted over the cylinder of the bracket 50 such that each side 44A and 44B of the pad 44 at the main portion 46 is adjacent an end of the cylinder with the cylinder spaced between the sides 44A and 44B. A pin 52 (one shown) is extended through a hole in one side 44A or 44B of the rear securing pad 44 at the main portion 46, through the cylinder and out through a hole in the other side 44B or 44A of the pad 44. The pin 52 is preferably fixably mounted in the sides 44A and 44B of the securing pad 44. The mounting of the securing pad 44 by the pin 52 to the bracket 50 allows the rear securing pad 44 to tilt on the bracket 50 with respect to the frame 32 of the trailer 10. The pad 44 is preferably mounted so that the extension portion 48 of the sides 44A and 44B of the securing pad 44 extends outward from the main portion 46 away from the frame 32. The end of the extension portion 48 opposite the main portion 46 is preferably angled upward. The outer side 44B of the rear securing pad 44 also preferably has an outwardly angled flange 44D which is mounted on the top end of the outer side 44B. The end of the flange 44D adjacent the end of the extension portion 48 is angled upward similar to the angle of the extension portion 48.

The center portion 44C of the pad 44 has rollers 54 which extend between the sides 44A and 44B of the pad 44. The rollers 54 are rotatably mounted on pins 44 which extend through both sides 44A and 44B of the securing pad 44 (FIG. 5). In an alternate embodiment (not shown), the securing pads 44 do not have rollers 54 or the rollers 54 do not rotate. In the preferred embodiment, there are three rollers 54 evenly spaced apart along the length of the main portion 46 of the securing pad 44. The rollers 54 preferably have a cylindrical shape with an outwardly angled flange 54A adjacent the outer side 44B of the pad 44. The angled flanges 54A assist in positioning the container 250 on the frame 32 of the trailer 10 during loading and unloading.

A locking mechanism 56 (one shown) is mounted in the extension portion 48 of each rear securing pad 44 (FIG. 5). The locking mechanism 56 includes a handle 58 and a pin 60. The mechanism 56 operates by rotating the handle 58 which extends the pin 60 upward through an opening 44E in the center portion 44C of the securing pad 44 at the extension portion 48 and into the opening (not shown) in the bottom corner 254 of the container 250. The locking mechanism 56 is preferably similar to a retractable twistlock such as sold by West Lake Intermodal, Inc.

Figure 6:
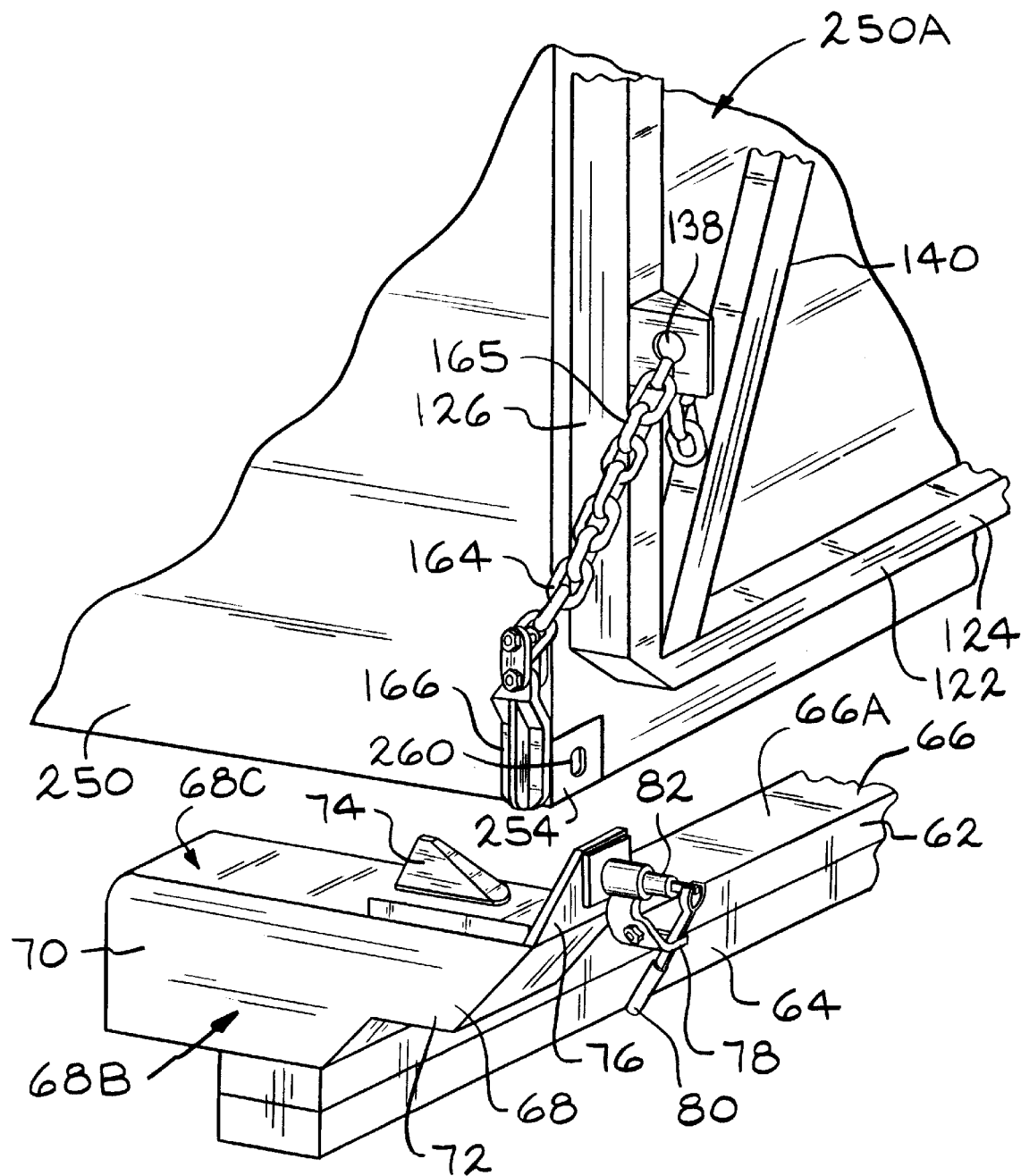
FIG. 6 is a partial perspective view of the bottom corner 254 of the container 250 at the front end 250A showing the attachment of the spider 122 to the container 250.

A front beam 62 is mounted between the ends 32A and 32B of the frame 32, spaced slightly away from the front end 32A of the frame 32. The front beam 62 preferably extends parallel to the end beam 42 and perpendicular to the frame members 34 (FIG. 2). The front beam 62 preferably includes a lower portion 64 and an upper portion 66. The lower portion 64 is preferably mounted on the bottom flanges 34B of the frame members 34. The lower portion 64 preferably has a length similar to the length of the end beam 42 and extends outward beyond the frame members 34 on both sides the same distance as the end beam 42. The upper portion 66 includes a side sections 66A (one shown). The side sections 66A are preferably mounted on top of the lower portion 64 adjacent each end and extend from the end of the lower portion 64 to the webbing 34C of the frame members 34 (FIG. 6). The upper and lower portions 64 and 66 preferably each have a hollow, tubular rectangular shape similar to the shape of the end beam 42.

The front beam 62 has front securing pads 68 (one shown) fixably mounted adjacent each end (FIG. 6). In the preferred embodiment, the front securing pads 68 do not pivot or tilt. The front securing pads 68 have a shape similar to the rear securing pads 44 and have an inner side (not shown) and an outer side 68B with a center portion 68C therebetween forming a main portion 70 and an extension portion 72. The main portion 70 of the front securing pads 68 has a rectangular shape with a truncated apex. The end of the main portion 70 opposite the extension portion 72 is also truncated and rounded. The center portion 68C of the front securing pads 68 is preferably a single plate 112 and does not contain rollers. The front securing pads 68 are mounted such that the extension portion 72 extends outward from the main portion 70 toward the front end 32A of the frame 32. The extension portion 72 of the front pads 68 has a ramp 74 which extends into the opening (not shown) in the bottom corner 254 at the front end 250A of the container 250 (FIG. 6). The extension portion 72 also has an end plate 76 on the end opposite the main portion 70. The end plate 76 has a locking mechanism 78 similar to the locking mechanism 56 of the rear securing pads 44. The locking mechanism 78 includes a handle 80 and a pin 82. The pin 82 extends into an opening 260 in the bottom corner 254 of the container 250 on the front end 250A (FIG. 6). The pin 82 extends into the opening 260 essentially parallel to the longitudinal axis A—A of the trailer 10. Tanks (not shown) are preferably mounted on the front beam 62 between the end of the beam 62 and the adjacent frame member 34. The tanks are preferably used for hydraulic oil and diesel oil for operating the trailer 10.

Figure 4:
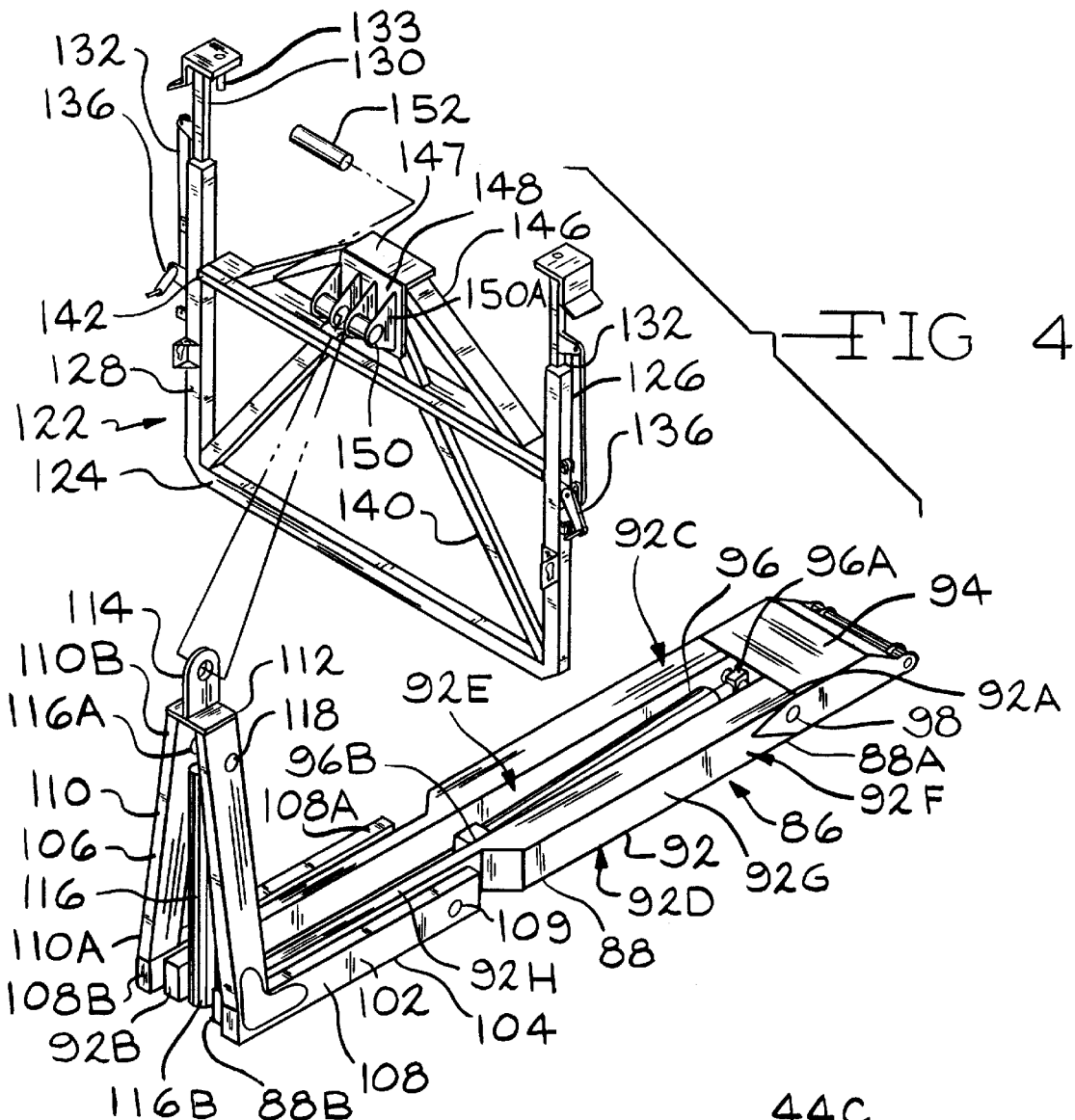
FIG. 4 is a partial exploded, perspective view of the lift device 86 and the spider 122.

The lift device 86 includes a first portion 88 and a second portion 102. The first portion 88 has opposed ends 88A and 88B and is pivotably mounted between the frame members 34 of the frame 32. In the preferred embodiment, the lift device 86 is mounted at one end 88A between the first and second rear axles 36 and 38, in front of the first cross bar 40. The first portion 88 of the lift device 86 preferably has a pair of arm members 92 each having a first end 92A and a second end 92B, with a top wall 92C, a bottom wall 92D, an inner wall 92E (one shown) and an outer wall 92F (one shown) extending between the ends 92A and 92B. The arm members 92 have a first section 92G adjacent the first end 92A and a second section 92H adjacent the second end 92B. The first section 92G preferably has an essentially square cross-section with a width greater than the width of the second section 92H. The arm members 92 are preferably mirror images of each other and are mounted such that the inner wall 92E of one arm member 92 is adjacent the inner wall 92E of the other arm member 92 as viewed from the rear of the trailer 10 (FIGS. 2 and 4). The outer walls 92F of the arm members 92 extend parallel to each other and are spaced apart the same distance the entire length of the arm members 92. The inner walls 92E of the arm members 92 angle inward toward each other between the first section 92G and the second section 92H of the arm members 92. The first ends 92A of the arm members 92 are provided with an end cap 94 and are pivotably connected to the frame members 34 by a pin 98 which extends between and through each of the frame members 34 perpendicular to the longitudinal axis A—A of the trailer 10. The pin 98 is preferably fixably mounted in the frame members 34 and extends through holes in each of the first ends 92A of the arm members 92. The holes are preferably provided with bearings (not shown) to allow for easier rotation of the arm members 92 on the pin 98. In the preferred embodiment, when the lift device 86 is in the fully retracted position (FIG. 2), the arm members 92 extend above the frame members 34. However, the arm members 92 do not extend upward above the front or rear securing pads 44 or 58.

A first lifting unit 96 is mounted between the arm members 92 and extends parallel to the arm members 92. In the preferred embodiment, the extendable end 96A of the first lifting unit 96 is mounted on the bottom side of the end cap 94. The extendable end 96A of the lifting unit 96 is preferably mounted between the arm members 92 by a pin 98 which is fixably mounted between and completely through the arm members 92. The other end 96B of the lifting unit 96 is preferably mounted on the second cross bar which extends between the frame members 34 of the frame 32 by a pin 100 (FIG. 3). The ends 96A and 96B of the lifting unit 96 are mounted such as to be able to pivot as necessary during movement of the lift device 86.

The second portion 102 of the lift device 86 preferably has lower and upper sections 104 and 106 with the upper section 104 mounted perpendicular to the lower section 106 such as to form an L-shape. The lower section 104 includes a pair of lower members 108 having opposed first and second ends 108A and 108B. The lower members 108 are mounted at the first end 108A to the second section 92H of the arm members 92 of the first portion 88 of the lift device 86 adjacent the first section 92G. In the preferred embodiment, the lower members 108 are pivotably mounted at the first end 108A on the outer walls 92F of the arm members 92 with the arm members 92 spaced between the lower members 108. The lower members 108 preferably extend parallel and adjacent to the arm members 92 when the lift device 86 is in the fully retracted position. In the preferred embodiment, the first end 108A of the lower members 108 are separately connected to the arm members 92 by pins 109. The lower members 108 preferably extend the entire length of the second section 92H of the arm members 92 so that the second end 108B of the lower members 108 are adjacent the second ends 92B of the arm members 92. The upper section 106 of the second portion 102 of the lift device 86 includes a pair of upper members 110 having opposed first and second ends 110A and 110B. The first ends 110A of the upper members 110 are mounted on the second ends 108B of the lower members 108. The upper members 110 are mounted perpendicular to the lower members 108. The upper members 110 are mounted such that the second ends 110B of the upper members 110 are angled toward each other. The second ends 110B of the upper members 110 are connected together by a plate 112 having an eye 114 extending outward on a side opposite the upper members 110 (FIG. 4). In an alternative embodiment (not shown), the plate connecting the second ends of the upper member together has a hook. The members 108 and 110 of the second portion 102 of the lift device 86 are preferably constructed of a similar material and have a rectangular, hollow tubular shape.

A second lifting unit 116 is mounted between the second ends 110B of the upper members 110 and the second ends 108B of the lower members 108 of the second portion 102 of the lift device 86 (FIG. 3). The extending end 116A of the lifting unit 116 is pivotably mounted on a pin 118 extending between the upper members 110 of the upper portion 110 adjacent the second end 110B. The other end 116B of the lifting unit 116 is pivotably mounted on a pin 120 extending between and through the second end 92B of the arm members 92 of the first portion 88 of the lift device 86. The first and second lifting units 96 and 116 are preferably similar to hydraulic cylinders which are well known in the art.

Figure 7:
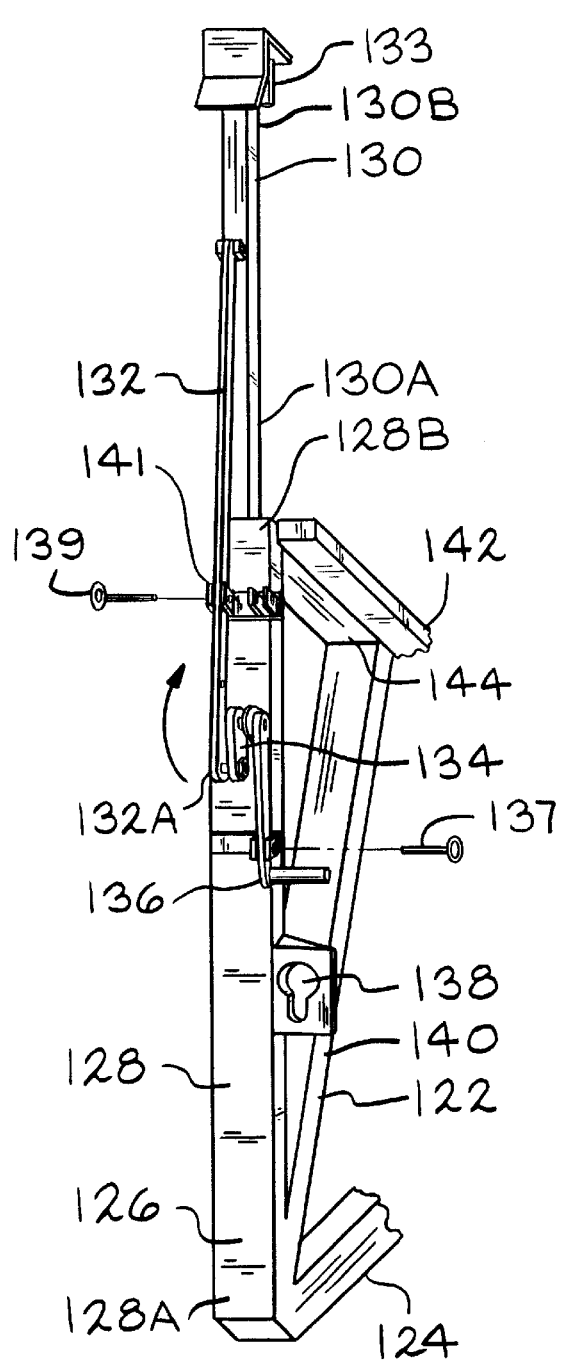
FIG. 7 is a partial side view of the spider 122 showing the side member 126 in the unextended position.
Figure 8:
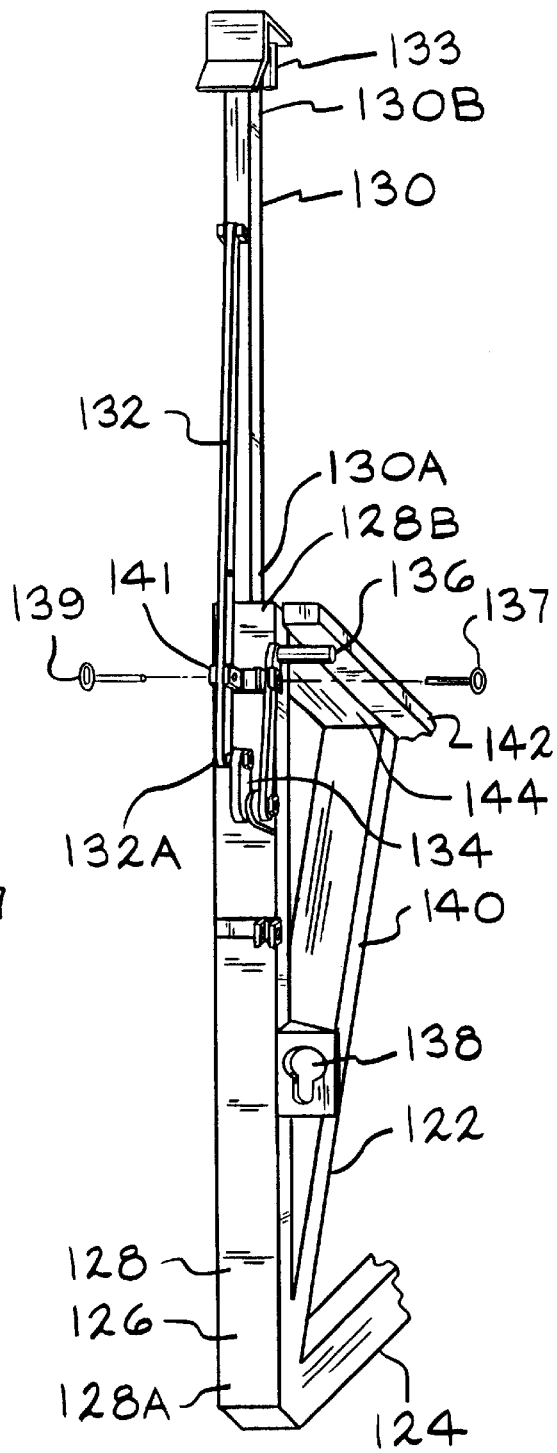
FIG. 8 is a partial side view of the spider 122 showing the side member 126 in the extended position.

In the preferred embodiment, the attachment structure or spider 122 has an essentially rectangular shape with a bottom member 124 and a middle member 142 extending between two side members 126. The spider 122 preferably has a width essentially the same as the width of the container 250. The height of the spider 122 is preferably less than the height of the container 250. The securing chains 164 (to be described in detail hereinafter) compensate for the distance between the bottom member 124 of the spider 122 and the bottom corners 254 of the container 250. The side members 126 are mounted at each end of the bottom member 124 and the middle member 142 and extend upward from the bottom members 124 perpendicular to the bottom and middle members 124 and 142. The side members 126 preferably include a main portion 128 with an extension arm 130 telescopingly mounted within. The main portion 128 preferably has a first and second end 128A and 128B and a hollow, rectangular tubular shape. The first end 128A of the main portion 128 is preferably mounted on one end of the bottom member 124. The connection corner of the first end 128A of the main portion 128 and the bottom member 124 is cut away or angled to allow for connection of the locking mechanism 78 of the first securing pad 68 to the bottom corner 254 of the container 250 (FIG. 6). The second end 128B of the main portion 128 is preferably mounted on one end of a middle member 142. Alternately, the second end 128B of the main portion 128 of the side members 126 can extend above the middle member 142. The middle member 142 is then mounted on the main portion 128B of the side member 126 below the second end 128B. Extending the length of the main portion 128 allows the extension arm 130 to be shorter and also increases the structural strength of the spider 122 particularly, the strength of the side members 126. The middle member 142 preferably extends between the side members 126 at the second end 128B of the main portion 128 of the side members 126. The extension arm 130 preferably has a first and second end 130A and 130B and is positioned such that the first end 130 is telescopingly mounted in the second end 128B of the main portion 128. The size and shape of the extension arm 130 is such as to easily fit within the main portion 128. The extension arm 130 is connected by an extension rod 132 to the main portion 128. The first end 132A of the extension rod 132 is connected to the extension arm 130 and the second end 132B of the extension rod 132 is pivotably connected to a connector link 134 which is connected to a lever 136 mounted on the main portion 128 of the side member 126. The lever 136 is preferably mounted on the side of the main portion 128 opposite the mounting of the bottom member 124 (FIGS. 7 and 8). The second end 130B of the extension arm 130 preferably has a locator pin 133 which extends into the opening (not shown) in the top corner 252 of the container 250 at the front end 250A to help locate the spider 122 on the container 250. The main portion 128 of the side member 126 preferably also has a keyhole opening 138 on the side adjacent the lever 136. A first locking pin 137 is located on the side member 126 to lock the lever 136 in the extended or unextended position. A second locking pin 139 and a securing bracket 141 are mounted on the main portion 128 of the side members 126 adjacent the extension arm 130. The second locking pin 139 is used to secure the extension arm 130 between the legs of the securing bracket 141 to lock the extension arm 130 of the side member 126 in the extended or unextended position.

Figure 9:
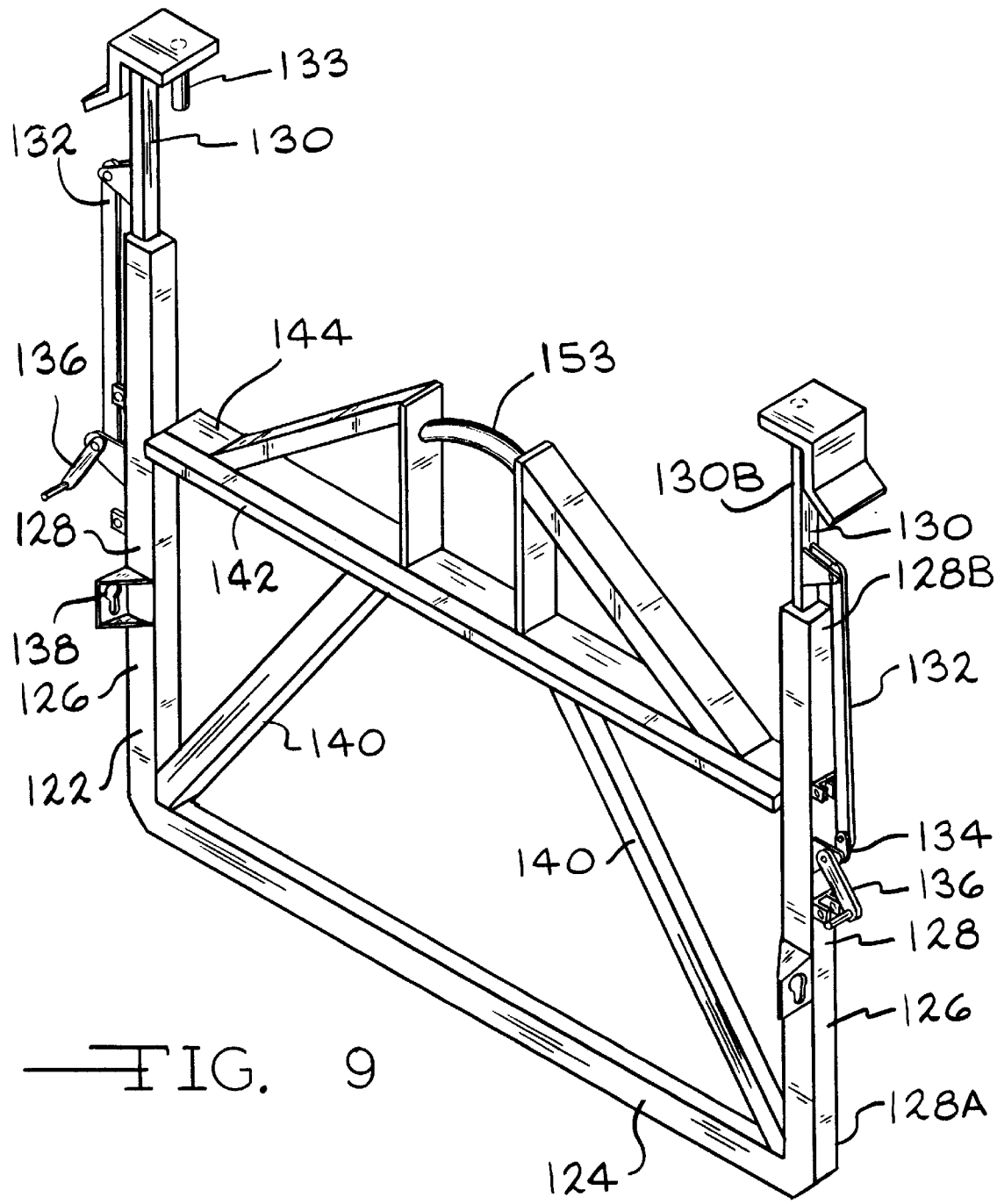
FIG. 9 is an alternate embodiment of the spider 122 having a loop 153.

A pair of lower angled members 140 extend upward from the junctions of the bottom member 124 and the side members 126 of the spider 122 at an angle such that the top ends of the lower angled members 140 are touching. In the preferred embodiment, the middle member 142 extends across the angled members 126 on a side adjacent the connector plate 148 (to be described in detail hereinafter). A pair of partial middle members 144 extend from the second end 128B of the main portion 128 of the side member 126 to the adjacent, angled member 140. In the preferred embodiment, the partial middle members 144 are mounted on the middle member 142 and both the middle member 142 and the partial middle members 144 are parallel to the bottom member 124. A pair of upper angled members 146 are mounted at one end on the partial middle members 144 and extend upward and inward toward each other. The second ends of the second angled member 142 are mounted to a cross bar 147 which connects the second ends of the upper angled members 146 together. A connector plate 148 is mounted on the second ends of the lower angled members 140 and on the cross bar 147 above the middle member 142. In the preferred embodiment, the top of the connector plate 148 is flush with the top of the cross bar 147. A yoke 150 is mounted on the side of the connector plate 148 opposite the lower angled members 140 and cross bar 147 (FIG. 4). The yoke 150 includes a pair of triangular shaped sides 150A having holes at the apex. The yoke 150 allows for connection of the spider 122 on the eye 114 of the lift device 86. The spider 122 is pivotably connected to the lift device 86 by a pin 152 which extends through the one side 150A of the yoke 150, through the eye 114 and through the other side 150A of the yoke 150. The pin 152 is preferably fixably mounted in the sides 150A of the yoke 150. In an alternate embodiment, as shown in FIG. 9, a loop 153 is mounted between the upper angled members 146. The loop 153 enables the spider 122 to be used with a lift device having a hook (not shown). In addition, in the alternate embodiment, the lower angled members 140 are preferably shortened to provide adequate clearance for the hook.

A pair of adaptors 154 (one shown) are provided for mounting on the middle member 142 of the spider 122. The adaptors 154 include a C-shaped member 156 and a locator member 158 (FIG. 10). The locator member 158 is mounted on the C-shaped member 156 such that the legs 156A of the C-shaped member 156 extend outward in a direction opposite the locator member 158. The locator member 158 has a locator pin 160 which extends downward from the locator member 158 perpendicular to the legs 156A of the C-shaped member 156. The adaptors 154 are preferably mounted on the middle member 142 adjacent each of the side members 126. The adaptors 154 are preferably mounted such that the middle member 142 is between the legs 156A of the C-shaped member 156 and the locator member 158 is on the side of the spider 122 opposite the connector plate 150 with the locator pin 160 extending downward. The adaptors 154 are secured on the middle member 142 of the spider 122 by a pin 162 which extends through holes 156B in the legs 156A of the C-shaped member 156 (FIG. 10). The adaptors 154 allow the spider 122 and the trailer 10 to be used with containers 250 or decks 262 having a shorter height.

A pair of securing chains 164 having a chain 165 with a lifting lug 166 at one end are provided for securing the container 250 onto the spider 122. The lifting lug 166 is preferably similar to the Corky Hook™ distributed by National Industrial Supply Company in Troy, Mich. The lifting lug 166 has a pin (not shown) which is inserted into an opening (not shown) in the side of the bottom corner 254 of the container 250. A hook (not shown) is provided on the bottom member 124 of the spider 122 to hold the lifting lug 166 when the spider 122 is not attached to a container 250.

IN USE

Figure 11:
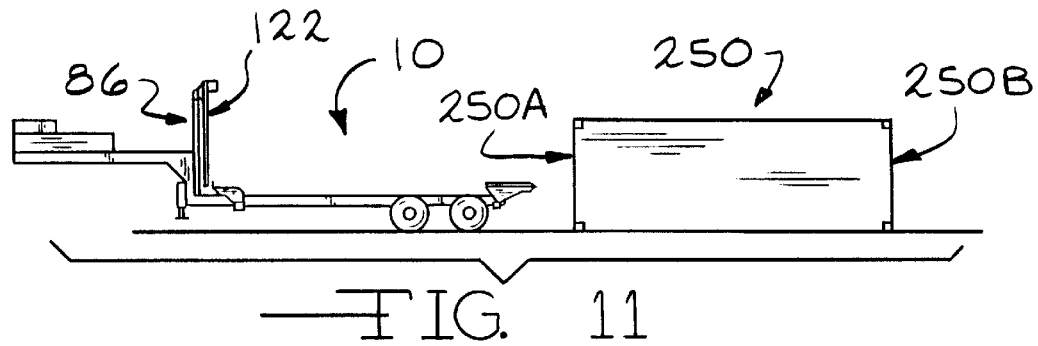
FIGS. 11 to 15 show the loading of a container 250 onto the trailer 10.

To use the trailer 10 to load a container 250, the trailer 10 is first hitched to the vehicle 200. In the preferred embodiment, the vehicle 200 and trailer hitch attachment and hook up is standard and well known in the art. Next, the trailer 10 and vehicle 200 are backed up to one end 250A or 250B of the container 250 (FIG. 11). In the preferred embodiment, the ends 250A and 250B of the container 250 are identical; therefore, the end adjacent the trailer 10 will be considered the front end 250A of the container 250. In the preferred embodiment, the trailer 10 is moved so that the back end 32B of the frame 32 of the trailer 10 is about 48 inches (122 cm) from the front end 250A of the container 250. The vehicle 200 is then preferably placed in neutral and all brakes released on both the vehicle 200 and the trailer 10. In the preferred embodiment, the vehicle 200 is in neutral during the entire loading and unloading process. The height of the spider 122 is then adjusted according to the height of the container 250. In the preferred embodiment, the spider 122 can be adjusted to fit containers 250 having a height of 96.0 inches (243 cm) or 102 inches (259 cm). In addition, if the container 250 has a height of 54.0 inches (137 cm) the adaptors 154 are mounted on the middle member 142 and used. When the adaptors 154 are used, the extension arms 130 of the side members 126 can be in either the extended or unextended position. Alternatively, the extension arms 130 of the side members 126 can be removed altogether when the adaptors 154 are used. To adjust the size of the spider 122, the height of the side members 126 is adjusted. Adjusting the height of the side members 126 is identical for each side member 126 therefore only one will be described in detail. To adjust the height of the side member 126 of the spider 122, assuming the side member 126 is in the unextended position, the first and second locking pins 137 and 139 are first unlatched which releases the lever 136 and the extension rod 132. Next, the lever 136 is rotated approximately 180° in an arc, upward along the side member 126 (FIG. 7). As the lever 136 is rotated upward, the connector link 134 also rotates upward similar to the lever 136. The first end 132A of the extension rod 132 first moves outward away from the side member 126 and then moves back toward the side member 126 as the connector link 134 travels in the 180° arc. The second end 132B of the extension rod 132 which is connected to the extension arm 130 of the side member 126 pivots at the connection point and acts to move the extension arm 130 upward a total distance equal to twice the length of the connector link 134 once the extension rod 132 is in the fully extended position (FIG. 8). The lever 136 is then locked along the side member 126 using the first locking pin 137 and the extension rod 132 is pinned using the second locking pin 139. To lower the extension arm 130 to reduce the height of the spider 122, the extension rod 132 and lever 136 are unpinned and the lever 136 is rotated downward 180°.

Figure 12:
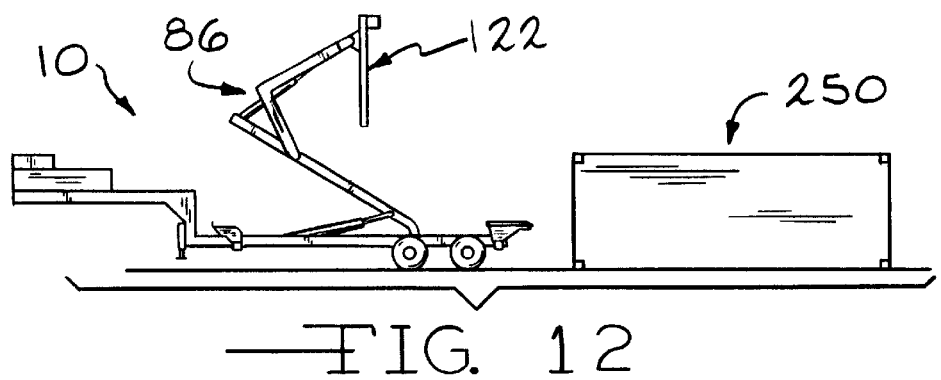
Figure 13:
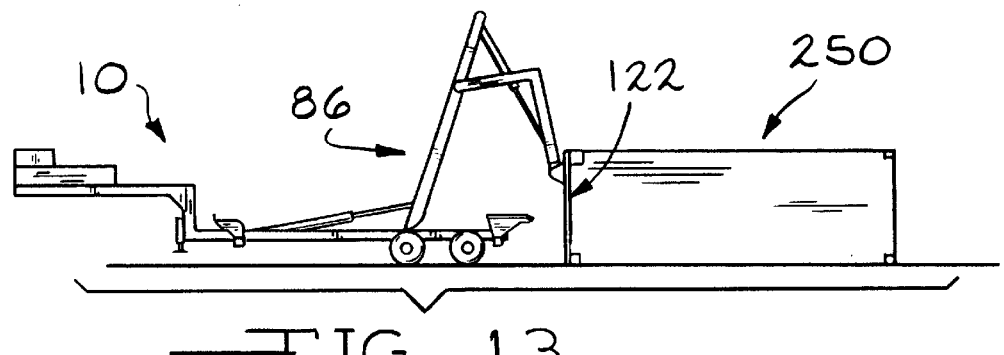
Figure 14:
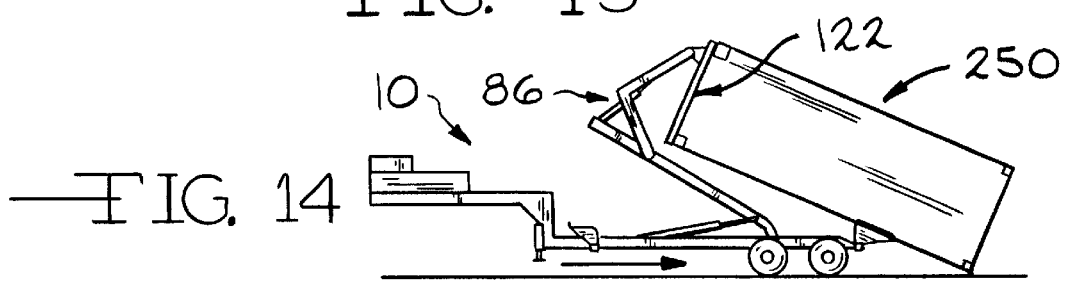
Figure 15:
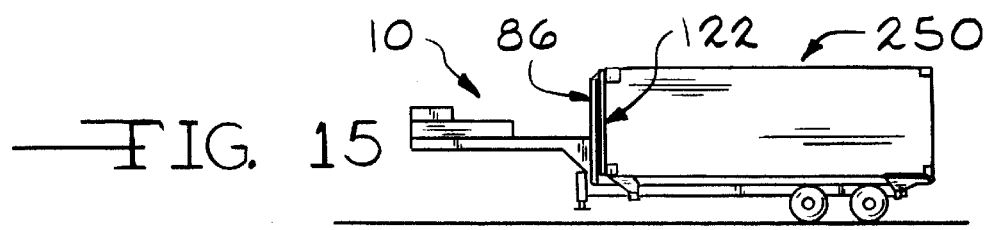

Once the spider 122 is the correct height, the lift device 86 is activated to move the spider 122 toward the front end 250A of the container 250 (FIG. 12). The lift device 86 is activated by the remote control unit which signals the controller 18 on the front section 12 of the trailer 10 to turn the engine "on". The cables (not shown) connecting the remote control unit to the container 250 allow the trailer 10 to be activated from various positions including in the cab of the vehicle 200 or along side the trailer 10. Activating the lift device 86 causes the lifting units 96 and 116 to lift and move the first and second portions 88 and 102 of the lift device 86. In the preferred embodiment, the second lifting unit 116 is activated first to move the second portion 102 of the lift device 86 into the lifted, docking position (FIG. 12). Once the second lifting unit 116 is fully extended with the spider 122 in the docking position, the first lifting unit 96 is activated to lift the first portion 88 of the lift device 86. The first lifting unit 96 moves the lift device 86 into the final docking position where the spider 122 is adjacent and slightly above the front end 250A of the container 250. In the preferred embodiment, as the lift device 86 moves toward the final docking position, contact of the spider 122 with the front end 250A of the container 250 moves the vehicle 200 and trailer 10 away from the container 250. This movement helps to correctly position the trailer 10 for loading of the container 250. As the lift device 86 is slowly moved into the final docking position, the pins 133 at the second end 130B of the extension arm 130 extend into the openings in the top of the top corners 252 of the container 250 at the front end 250A. When the adaptors 154 are used with shorter containers 250 or decks 262, the locator pins 160 of the adaptors 154 act similarly to the pins 133 of the second end 130B of the extension arm 130. Once the pins 133 or 160 are correctly aligned and inserted into the top corners 252, the lift device 86 is brought to the fully extended position. The spider 122 automatically locates the pins 133 or 160 into the top corners 252 of the container 250. The diesel engine is then turned "off" or alternately the engine is left to idle.

Next, the spider 122 is fully connected to the front end 250A of the container 250. To connect the bottom corners 254 of the container 250 to the spider 122, the pins of the lifting lugs 166 of the securing chains 164 are inserted into the openings 260 in the side of the bottom corners 254 of the container 250. Next, the chains 165 of the securing chains 166 are inserted into the keyhole openings 138 on the side members 126 of the spider 122 (FIG. 6). In the preferred embodiment, the chains 165 are mounted and secured in the keyhole openings 138 so that the end of the lifting lug 166 opposite the pin is angled upward. Preferably, each of the securing chains 164 is adjusted separately until there is no slack in the chains 165. In the preferred embodiment, when the container 250 is on level surface, the securing chains 164 on either side of the container 250 are secured identically such that the chain 165 extend through the keyhole openings 138 the same for both sides. However, when the container 250 is not on a level surface, each of the securing chains 164 will be connected at a different length. In the preferred embodiment, the shape of the keyhole openings 138 is such that the chain 165 is easily inserted through the top part of the opening 138 and is securely held in the bottom portion of the opening 138.

Once the spider 122 is securely attached to the front end 250A of the container 250, the lifting units 96 and 116 are activated to move the lift device 86 in the reverse direction to move the container 250 onto the trailer 10. In the preferred embodiment, to load the container 250, the lift device 86 is retracted in the same sequence but in reverse to the sequence of extending the lift device 86. As the lift device 86 moves, the lift device 86 lifts the front end 250A of the container 250 onto the rear securing pads 44 of the trailer 10. The flanges 44D on the outer sides 44B of the rear securing pads 44 assist in correctly positioning the container 250 on the trailer 10. As the front end 250A is lifted, the securing chains 164 connected to the bottom corners 254 of the container 250, adjust the spider 122 on the front end 250A of the container 250 to compensate for the orientation of the container 250 on the ground surface. This is especially important if the container 250 is on an uneven ground surface initially, prior to loading. Once the front end 250A of the container 250 is on the rear securing pads 44, the lift device 86 continues to move the container 250 forward onto the trailer 10. The rollers 54 on the rear securing pads 44 allow for easier movement of the container 250 onto the trailer 10. In the preferred embodiment, as the lift device 86 moves the container 250 onto the trailer 10, the weight and resistance of the container 250 causes the trailer 10 to roll backwards under the container 250. The container 250 remains in the same spot as the container 250 is moved and lifted onto the trailer 10. About three quarters of the way through the loading procedure, the container 250 is completely off the ground and completely on the trailer 10. The lift device 86 then moves the container 250 forward on the trailer 10 so that the bottom corners 254 at the front end 32A of the trailer 10 are on the front securing pads 68 and the bottom corners 254 at the back end 32B of the trailer 10 are on the rear securing pads 44. The ramps 74 on the front securing pads 68 helps to align the container 250 correctly on the front securing pads 68 and also help to position the container 250 on the trailer 10 front to back.

Once the container 250 is fully on the trailer 10, the engine turned "off". Next, the bottom corners 254 of the container 250 are locked in place on the securing pads 44 and 68 of the trailer 10. To lock the container 250 on the trailer 10, the handles 58 and 80 of the locking mechanisms 56 and 78 in the front and rear securing pads 44 and 68 are rotated such that the pins 60 and 82 of the locking mechanisms 56 and 78 extend into the openings 260 in the bottom corners 254 of the container 250. In the preferred embodiment, the locking mechanisms 56 in the rear securing pads 44 extend the pins 60 upward into the openings 260 in both bottom corners 254 at the back end 250B of the container 250. The locking mechanisms 78 in the front securing pads 68 preferably extend the pins 82 horizontally toward the back end 32B of the frame 32 of the trailer 10 and into openings 260 in the front of the bottom corners 254 of the container 250 (FIG. 6).

In the preferred embodiment, the spider 122 remains on the container 250 during transport of the container 250 by the vehicle 200. To unload the container 250, the above procedure is conducted in reverse.

The trailer 10 can be used with the Palletized loading system, the forced provides program, the total distribution system the Army aviation logistics support and AVLS helicopter field recovery. The container 250 can be easily loaded and unloaded without disturbing the ground surface upon which the container 250 is or will be located. The container 250 is not dragged or slid along the ground surface during loading and unloading. When the trailer 10 is not in use, the legs 28 on the front section 12 of the trailer 10 are lowered to the ground surface and locked in place and the trailer 10 is unhitched from the vehicle 200.

It is intended that the foregoing description be only illustrative of the present invention and that the present invention be limited only by the hereinafter appended claims.

I claim:

1. A self-contained trailer which connects to a vehicle and is adjacent a container having opposed ends with a top wall, a bottom wall and opposed sidewalls extending therebetween and with a pair of top corners and a pair of bottom corners at each end for loading of the container on the trailer for transport by the vehicle and for unloading of the container from the trailer, which comprises:

(a) a front section having opposed ends with a top side and a bottom side extending between the ends and with a mounting hitch mounted on the bottom side for connecting the trailer to the vehicle;

(b) a frame means having a front end and a rear ed with sides extending therebetween along a longitudinal axis of the trailer with the front end of the frame means connected to one end of the front section;

(c) at least one rear axle having wheels and mounted adjacent the rear end of the frame means;

(d) a lifting means having a first end and a second end and mounted at the first end on the frame means between the ends of the frame means;

(e) a removable and adjustable attachment means connected to the second end of the lifting means for attachment to the top and bottom corners of the container at one end for holding the container during loading and unloading of the container on the trailer and having parallel, spaced apart elongate members with opposed ends wherein each of the elongate members are extendable between the ends and lockable to allow the attachment means to be attached and locked onto containers having different heights;

(f) a pair of securing chains attachable between each of the bottom corners of the container at the one end and one of each of the elongate members of the attachment means for securing the attachment means onto the one end of the container and wherein a length of the securing chains is adjustable to allow for variations in the orientation of the container on a ground surface prior to loading the container onto the trailer;

(g) a control means mounted on the top side of the front section for controlling the lifting means for loading and unloading the container; and (h) front and rear pads for securing the bottom corners of the container at both ends onto the trailer.

2. The trailer of claim 1 wherein the rear pads have rollers to allow for easier sliding of the container onto the trailer.

3. The trailer of claim 1 wherein the attachment means is an attachment structure having a bottom section and a middle section extending between the elongate members wherein the attachment structure has an essentially rectangular shape with the bottom section extending between the elongate members adjacent one end of the elongate members and the middle section spaced above the bottom section between the ends of the elongate members wherein the elongate members are extendable upward away from the bottom section to enable the attachment structure to be attached to containers having different heights.

4. The trailer of claim 3 wherein a connection means is mounted on the middle section and engages a connector means on the lifting means to enable the lifting means to be connected to the attachment structure for loading the container onto the trailer.

5. The trailer of claim 4 wherein the connection means is a loop.

6. The trailer of claim 3 wherein each of the elongate members includes a first section and a second section with the first section telescopingly mounted in the second section wherein the first section is extended to increase a height of the attachment structure.

7. The trailer of claim 6 wherein an extension rod is connected to the first section and to a lever rotatably mounted on the second section wherein to extend the first section, the lever is rotated approximately 180°.

8. The trailer of claim 3 wherein a pair of adaptors are mounted on the middle section between the elongate members on a side opposite the connection means and wherein the adaptors engage the top corners of the container at the one end to enable the attachment structure to be attached to containers having a smaller height.

9. The trailer of claim 3 wherein the attachment structure is adjustable to fit containers having a height of 54.0 inches, 96.0 inches and 102.0 inches (137, 244 and 259 cm).

10. The trailer of claim 1 wherein the front pads have angled guides which guide the bottom corners of the container at the one end into locking position on the front pads.

11. The trailer of claim 3 wherein the other end of the elongate members opposite the bottom section of the attachment structure have pins which extend into openings in the top corners of the container at the one end for positioning the attachment structure on the one end of the container.

12. The trailer of claim 1 wherein the securing chains each include a chain and a lifting lug and wherein the lifting lugs are mounted into openings in the bottom corners of the container at the one end and the chains are secured through openings on the elongate members of the attachment structure.

13. An improved attachment structure for use with a trailer which connects to a vehicle and adjacent a container having opposed end walls, with opposed sidewalls spaced between the end walls and a top wall extending between the sidewalls and the end walls of the container with a pair of top corners located in the top wall of the container and a pair of side corners located in the side walls of the container adjacent each end wall, the trailer having a lifting means with a connector means for connecting to the attachment structure for loading of the container on the trailer for transport by the vehicle and for unloading the container from the trailer, the attachment structure which comprises:
  (a) two spaced apart, parallel and adjustable elongate side members with a top end and a bottom end, wherein each of the elongate side members have extensions which are telescopingly mounted and configured to be fixedly attached and locked to the top corners of the container at one end wall;
  (b) a pair of flexible, linkage securing means attachable between each of the side corners of the container at one end wall and one of each of the elongate side members for securing the attachment structure onto one end wall of the container and wherein a length of the flexible, linkage securing means is adjustable to allow for variations in the orientation of the container prior to lifting of the container onto the trailer; and
  (c) a connection means mounted on the attachment structure between the elongated side members on a side opposite the container when the attachment structure is attached to one end wall of the container, wherein the connection means engages the connector means on the lifting means of the trailer to enable the lifting means to load the container onto the trailer.

14. The attachment structure of claim 13 wherein the connection means is a loop.

15. The attachment structure of claim 13 wherein the extensions of each of the elongate side members is extended upward away from the bottom end of the elongate side members by an extension rod having opposed ends wherein one of the ends is connected to the extension and the other end is connected to the elongate side member.

16. The attachment structure of claim 15 wherein the other end of the extension rod is connected by a lever arm and a connector link to the elongate side member and wherein to extend the extension, the lever is rotated about 180°.

17. The attachment structure of claim 13 wherein the flexible, linkage securing means each include a chain and a lifting lug and wherein the lifting lug are mounted into openings in the side corners of the container at one end and the chains are secured through openings in the elongate side members for securing the attachment structure onto the container.

18. An improved attachment structure for use with a trailer which connects to a vehicle and adjacent a container having opposed ends with a top wall, a bottom wall and opposed sidewalls extending therebetween and with a pair of top corners and a pair of bottom corners at each end, the trailer having a lifting means with a connector means for connecting to the attachment structure for loading of the container on the trailer for transport by the vehicle and for loading the container from the trailer, the attachment structure which comprises:
  (a) two spaced apart, parallel and adjustable elongate side members with a top end and a bottom end, wherein each of the elongate side members have extensions which are telescopingly mounted and configured to be attached and locked to the top corners of the container at one end;
  (b) a connection means mounted on the attachment structure between the elongated side members on a side opposite the container when the attachment structure is attached to one end of the container, wherein the connection means engages the connector means on the lifting means of the trailer to enable the lifting means to load the container onto the trailer; and
  (c) a pair of adaptors mounted on the attachment structure between the elongate side members on a side opposite the connection means, wherein the adaptors engage the top corners of the container to enable the attachment structure to be attached to containers having a smaller height.

19. A method for loading a container on a trailer for transport by a vehicle, the container having opposed ends with a top wall, a bottom wall and opposed sidewalls extending therebetween and with a pair of top corners and a pair of bottom corners at each end with openings at the corners, which comprises:
  (a) providing a self-contained trailer which connects to the vehicle and is adjacent the container for transport of the container by the vehicle, the trailer including a front section having opposed ends with a top side and a bottom side extending between the ends and with a mounting hitch mounted on the bottom side for connecting the trailer to the vehicle; a frame means having a front end and a rear end with sides extending, therebetween along a longitudinal axis of the trailer with the front end of the frame means connected to one end of the front section; at least one rear axle having wheels and mounted adjacent the rear end of the frame means; a lifting means having a first end and a second end and mounted at the first end on the frame means between the ends of the frame means; a removable and adjustable attachment means connected to the second end of the lifting means for attachment to the top and bottom corners of the container at one end for holding the container during loading and unloading of the container on the trailer and having parallel spaced apart elongate side members with opposed ends wherein each of the elongate side members are extendable between the ends and lockable to allow the attachment means to be attached and locked onto containers having different heights; a pair of securing chains attachable between each of the bottom corners of the container at the one end and one of each of the elongate members of the attachment means for securing the attachment means onto the one end of the container and wherein a length of the securing chains is adjustable to allow for variations in the orientation of the container on a ground surface prior to loading the container onto the trailer; a control means mounted on the top side of the front section for controlling the lifting means for loading and unloading the container; and front and rear pads for securing the bottom corners of the container at both ends onto the trailer;

(b) connecting the trailer to the vehicle using the mounting hitch;

(c) moving the vehicle and trailer adjacent one end of the container so that the rear end of the frame means opposite the vehicle is adjacent the one end of the container;

(d) extending the lifting means of the trailer using the control means so that the attachment means is adjacent the one end of the container;

(e) adjusting the elongate side members to correspond to a height of the container and attaching the attachment means to the top and bottom corners of the container at the one end; and (f) attaching the securing chains between the bottom corners of the container at one end and the elongate side members of the attachment means and retracting the lifting means with the vehicle in neutral so that the container is moved onto the trailer along the longitudinal axis of the trailer wherein as the lifting means lifts the container, the vehicle and trailer are pulled toward the container so that the container moves onto the trailer.

20. The method of claim 19 wherein a connection means is mounted on the middle section and engages a connector means on the lifting means to enable the lifting means to be connected to the attachment structure for loading the container onto the trailer.

21. The method of claim 19 wherein after the container is fully on the trailer, the container is locked to and secured on the front and rear pads of the trailer.

22. The method of claim 19 wherein to unload the container from the trailer after step (f), the lifting means is extended to lift the attachment means and one end of the container so that the container is moved off the trailer so that the other end of the container is moved onto the ground surface, wherein the lifting means continues to be extended so that the force of the lifting arm on the container which is on the ground surface, moves the vehicle forward so that the container is completely on the ground surface and wherein the attachment means is detached from the container and the lifting means is retracted to move the lifting means completely back onto the trailer.

23. A self-contained trailer which connects to a vehicle and is adjacent a container having opposed ends with a top wall, a bottom wall and opposed sidewalls extending therebetween and with a pair of top corners and a pair of bottom corners at each end for loading of the container on the trailer for transport by the vehicle and for unloading of the container from the trailer, which comprises:

(a) a front section having opposed ends with a top side and a bottom side extending between the ends and with a mounting hitch mounted on the bottom side for connecting the trailer to the vehicle;

(b) a frame means having a front end and a rear end with sides extending therebetween along a longitudinal axis of the trailer with the front end of the frame means connected to one end of the front section;

(c) at least one rear axle having wheels and mounted adjacent the rear end of the frame means;

(d) a lifting means having a first end and a second end and mounted at the first end on the frame means between the ends of the frame means;

(e) a removable and adjustable attachment means having an essentially rectangular shape and connected to the second end of the lifting means for attachment to the top and bottom corners of the container at one end for holding the container during loading and unloading of the container on the trailer and having parallel, spaced apart elongate members with opposed ends and having a bottom section and a middle section with the bottom section extending between the elongate members adjacent one end of the elongate members and the middle section spaced above the bottom section between the ends of the elongate members wherein each of the elongate members are extendable between the ends upward away from the bottom section and lockable to allow the attachment means to be attached and locked onto containers having different heights;

(f) a pair of adaptors mounted on the middle section between the elongate members on a side opposite the connect means wherein the adaptors engage the top corners of the container at one end to enable the attachment means to be attached to containers having a smaller height;

(g) a control means mounted on the top side of the front section for controlling the lifting means for loading and unloading the container; and (h) front and rear pads for securing the bottom corners of the container at both ends onto the trailer.

24. A self-contained trailer which connects to a vehicle and is adjacent a container having opposed ends with a top wall, a bottom wall and opposed sidewalls extending therebetween and with a pair of top corners and a pair of bottom corners at each end for loading of the container on the trailer for transport by the vehicle and for unloading of the container from the trailer, which comprises:

(a) a front section having opposed ends with a top side and a bottom side extending between the ends and with a mounting hitch mounted on the bottom side for connecting the trailer to the vehicle;

(b) a frame means having a front end and a rear end with sides extending therebetween along a longitudinal axis of the trailer with the front end of the frame means connected to one end of the front section;

(c) at least one rear axle having wheels and mounted adjacent the rear end of the frame means;

(d) a lifting means having a first end and a second end and mounted at the first end on the frame means between the ends of the frame means;

(e) a removable and adjustable attachment means having an essentially rectangular shape and connected to the second end of the lifting means for attachment to the top and bottom corners of the container at one end for holding the container during loading and unloading of the container on the trailer and having parallel, spaced apart elongate members with a first section and a second section and opposed ends and having a bottom section and a middle section with the bottom section extending between the elongate members adjacent one end of the elongate members and the middle section spaced above the bottom section between the ends of the elongate members wherein first section of the elongate members is telescopingly mounted in the second section is extendable upward away from the bottom section and lockable to allow the attachment means to be attached and locked onto containers having different heights and wherein an extension rod is connected to the first section to a layer rotatably mounted on the second section wherein to extend the first section, the lever is rotated approximately 180°;

(f) a control means mounted on the top side of the front section for controlling the lifting means for loading and unloading the container; and (g) front and rear pads for securing the bottom corners of the container at both ends onto the trailer.

25. An improved attachment structure for use with a trailer which connects to a vehicle and adjacent a container having opposed ends with a top wall, a bottom wall and opposed sidewalls extending therebetween and with a pair of top corners and a pair of bottom corners at each end, the trailer having a lifting means with a connector means for connecting to the attachment structure for loading of the container on the trailer for transport by the vehicle and for unloading the container from the trailer, the attachment structure which comprises:

(a) two spaced apart, parallel and adjustable elongate side members with a top end and a bottom end, wherein each of the elongate side members have extensions which are telescopingly mounted and configured to be attached and locked to the top corners of the container at one end and are extended upward away from the bottom end of the elongate side members by an extension rod having opposed ends wherein one of the ends is connected to the extension and the other end is connected by a lever arm and a connector link to the elongate side member and wherein to extend the extension, the lever is rotated about 180°; and (b) a connection means mounted on the attachment structure between the elongated side members on a side opposite the container when the attachment structure is attached to one end of the container, wherein the connection means engages the connector means on the lifting means of the trailer to enable the lifting means to load the container onto the trailer.

* * * * *

UNITED STATES PATENT AND TRADEMARK OFFICE
CERTIFICATE OF CORRECTION

PATENT NO. : 5,803,699
DATED : September 8, 1998
INVENTOR(S) : Donald L. Pinkston Page 1 of 2

It is certified that error appears in the above-identified patent and that said Letters Patent is hereby corrected as shown below:

Column 5, line 11, "real axles" should be --rear axles--.

Column 7, line 67, "44 or 58" should be "44 or 68--.

Column 9, line 33, "first end 130" should be --first end 130A--.

Column 12, lines 26 and 27, "chains 166" should be --chains 164--.

Column 13, line 15, after "engine" and before "turned", --is-- should be inserted.

Column 13, line 65 (Claim 1), "read ed" should be --rear end--

UNITED STATES PATENT AND TRADEMARK OFFICE
CERTIFICATE OF CORRECTION

PATENT NO. : 5,803,699
DATED : September 8, 1998
INVENTOR(S) : Donald L. Pinkston It is certified that error appears in the above-identified patent and that said Letters Patent is hereby corrected as shown below:

Column 18, line 63 (Claim 24), after "section" and before "is", --and-- should be inserted.

Column 18, line 67 (Claim 24), "layer" should be --lever--.

Signed and Sealed this

Thirteenth Day of April, 1999

Attest:

Q. TODD DICKINSON

Attesting Officer

Acting Commissioner of Patents and Trademarks